United States Patent [19]

Witehira

[11] Patent Number: 5,045,415
[45] Date of Patent: Sep. 3, 1991

[54] ELECTRODE PLATE STRUCTURE

[76] Inventor: Pita Witehira, 7 Market Street, Templeview, Hamilton, New Zealand

[21] Appl. No.: 463,027

[22] Filed: Jan. 10, 1990

[30] Foreign Application Priority Data

Jan. 26, 1989 [NZ] New Zealand .......................... 227296

[51] Int. Cl.⁵ .......................... H01M 2/38; H01M 4/02
[52] U.S. Cl. ........................................ 429/81; 429/209
[58] Field of Search .................... 429/209, 81, 243, 244

[56] References Cited

U.S. PATENT DOCUMENTS

| | | | |
|---|---|---|---|
| 1,032,158 | 7/1912 | Porscke et al. | 429/243 |
| 1,522,613 | 1/1925 | Cole . | |
| 2,250,233 | 7/1941 | Parkington | 429/209 X |
| 2,831,910 | 4/1958 | Bates . | |
| 3,069,486 | 12/1962 | Solomon et al. | 429/244 X |
| 3,314,822 | 4/1967 | Jost . | |
| 3,434,883 | 3/1969 | Babusci et al. . | |
| 3,453,145 | 7/1969 | Duddy | 429/244 |
| 3,527,612 | 9/1970 | Eisenberg | 429/209 X |
| 3,556,853 | 1/1971 | Cannone . | |
| 3,973,991 | 8/1976 | Cestaro et al. . | |
| 4,051,304 | 9/1977 | Snook | 429/94 |
| 4,151,331 | 4/1979 | Hug et al. | 429/94 |
| 4,173,066 | 11/1979 | Kinsman | 29/623.1 |
| 4,204,036 | 5/1980 | Cohen et al. | 429/152 |
| 4,283,844 | 8/1981 | Milden et al. | 29/623.5 |
| 4,473,623 | 9/1984 | Ishikura et al. . | |
| 4,486,517 | 12/1984 | Bender | 429/209 X |
| 4,567,120 | 1/1986 | Jorne et al. | 429/209 X |
| 4,761,352 | 8/1988 | Bakos et al. | 429/94 |
| 4,769,299 | 9/1988 | Nelson | 429/57 |
| 4,883,728 | 11/1989 | Witehira | 429/160 |

FOREIGN PATENT DOCUMENTS 59-83350 5/1984 Japan .

Primary Examiner—Stephen J. Kalafut
Attorney, Agent, or Firm—Knobbe Martens Olson & Bear

[57] ABSTRACT

An electrode plate for use in electrochemical cells such as batteries that is formed of multiple layers of electrode material. Each layer is provided with pores through the layer and creases, folds, corrugations, scoring, or the like and is juxtaposed on and electrically connected with the other layers in the plate without intervening layers of opposite polarity. Electrolyte flow by diffusion and/or capillary action takes place within the plate through the pores and between the layers. In an alternative embodiment, a plate is formed of layered grids to which is applied a paste of active material. The grids are then formed into a multilayered plate.

6 Claims, 1 Drawing Sheet

ELECTRODE PLATE STRUCTURE

PRIORITY CLAIM

This application claims priority from New Zealand application No. 227,296 (complete specification) filed Jan. 26, 1989.

BACKGROUND OF THE INVENTION

The present invention relates to electrode plate structures, particularly to electrode plates suitable for use in electrochemical cells such as lead acid batteries.

The capacity of a lead acid battery, such as those in common use in automobiles, is related to the surface area of electrode plate accessible to the electrolyte. While a simple lead acid battery can be made using solid lead for one electrode, and oxidized solid lead for another electrode, such a battery has very little capacity, because the surface area of the electrodes in contact with the electrolyte is relatively small, so that the electrochemical reaction that occurs does so on a small scale, relatively slowly.

A major innovation in battery plate design was the development of the pasted electrode. In this design, particles of lead or lead oxide are held in a porous matrix of binder material. The electrolyte is permitted to permeate the matrix, and simultaneously contact a large number of particles, having a correspondingly large surface area. As a result, the magnitude of the electrochemical reaction occurring in the electrodes is much greater.

In the pasted plate electrode, a grid or restraining base is used, upon which is pasted active material which consists of porous "active mass." Electrolyte penetrates this mass by diffusion processes. The penetration of the mass by the aqueous electrolyte is restricted by the porosity of the active mass.

Unfortunately, there are limitation on the rate at which electrolyte can penetrate the active mass, to permit continuance of the electrochemical reactions in the plate at an optimum rate. An increase in the flow of electrolyte through and around the active mass would have a significant impact on the performance of the battery.

Accordingly, it is an object of the present invention to provide an electrode plate structure that provides increased battery capacity.

A further object of the present invention is to provide an electrode plate structure that simplifies the manufacturing process for such plates.

An object of an alternative embodiment of the present invention is to provide a pasted electrode plate structure that has a greater capacity than conventional pasted plates.

Yet another object of the present invention is to provide an electrode plate having a high surface area that uses capillary action and/or enhanced diffusion processes to facilitate contact between the active mass and the electrolyte, thereby increasing the capacity of the battery.

These and other objects of the present invention can be appreciated by reference to the detailed discussion that follows, together with the appended drawings.

SUMMARY OF THE INVENTION

In accordance with one aspect of the invention, there is provided an electrode plate for use in an electrochemical cell, comprising a plurality of conductive layers of electrode material, each layer of electrode material having surface structure for separating it from adjacent layers by a sufficient distance to permit movement of electrolyte material between the layers, each layer being electrically connected to each adjoining layer of the electrode plate, without intervening layers of different polarity. Preferably, the surface structure comprises surface irregularities on the layers of the plate. Those surface irregularities can comprise, for example, corrugations, furrows, ridges, grooves, creases, or embossments on at least one surface of the facing layers of the electrode plate.

In accordance with one preferred embodiment of the invention, the electrode plate is also provided with perforations or pores formed in the layers of electrode material to permit movement of electrolyte through the layers.

In another preferred embodiment, the layers are formed of a single sheet of electrode material that is folded and compressed to form multiple electrically connected layers. Lead is a particularly preferred electrode plate material.

In accordance with another aspect of the invention, there is provided a battery, comprising a housing, an electrolyte in the housing, and at least one cell in the electrolyte, the cell comprising a cathode plate and an anode plate, wherein at least one of the plates is a layered plate of the type previously described.

Finally, there is provided an electrode plate comprising a plurality of conductive grids, each grid having a porous active mass paste applied thereto, the grids permeable to electrolyte and having flow passageways therebetween of sufficient dimension to permit capillary flow of electrolyte between the grids, wherein all of the grids in the plate are electrically connected and wherein there are no layers of opposite polarity interposed between the grids of the plate.

DETAILED DESCRIPTION OF THE INVENTION

In the present invention, each electrode plate is formed of multiple layers of electrically connected electrode material. Each layer is separated by only a very small distance, so that capillary action or diffusion can permit effective permeation of fresh electrolyte into contact with the entire surface area of the active plate material.

In a preferred embodiment, the plates of the present invention increase the flow rate of electrolyte to the plate itself by use of capillary assisted diffusion, such capillary action taking place between layers or laminations of the electrode structure.

Figure 1:
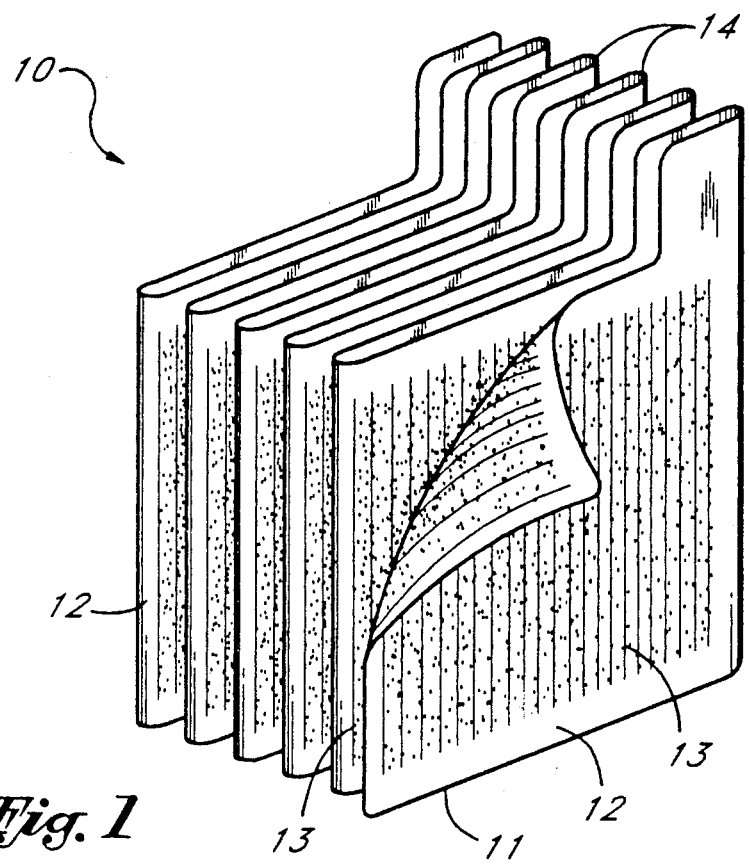
FIG. 1 is an expanded perspective view of a folded thin metal electrode plate according to the present invention.

FIG. 1 illustrates a folded or concertina embodiment of the invention, where each electrode plate 10 is formed of multiple layers 11 of thin, electrically conductive material of suitable composition. For use in a lead acid battery, for example, the layers 11 may be formed of thin lead foil in one plate, and lead foil with an external layer of lead oxide in another plate. The layers 11 may advantageously be about 5 to about 20 micrometers in thickness, preferably from about 10 to about 12 micrometers in thickness.

In one preferred embodiment, the plate of FIG. 1 is formed with perforations 12 throughout. Moreover, it is preferred that the electrode layers 11 be provided with corrugations, ridges, grooves, furrows, nubs, bumps, scorings, or creases 13, and the like, to facilitate access of electrolyte to the plate surface after the layered electrode plate is assembled. The corrugations 13 and the like can be formed in tandem with or simultaneously with the perforations 12. The corrugations 13 and the like can be linear, or can be circular, wavy, random, or any other desired configuration that will facilitate liquid transfer between layers and prevent adjacent layers from laying in such close proximity that liquid movement therebetween is prevented. It will be appreciated that as an alternative to the corrugations 13 or the like, other material may be placed between the sheets or layers 11 of electrode material to facilitate liquid movement. Thus, for example, after forming lead into a foil, a particulate material may be pressed into the surface of the foil to provide separation of the foil layers 11 when juxtaposed.

The plate itself is formed of multiple layers 11 of electrode material. In the embodiment illustrated in FIG. 1, the multiple layers 11 are formed by folding a continuous web of electrode material in concertina or zig-zag fashion. Of course, it is also feasible to form the multiple layers 11 of separate sheets of electrode material, which are electrically connected (e.g., at one or more edges, or by conductive pathways extending through the multiple layers 11). FIG. 1 shows an expanded concertina folded plate structure prior to compression. In order to complete the manufacture, the layers are compressed into a plate structure.

An automobile battery, for example, may have 6 cells, each of which has about 11 individual positive and negative plates, and each plate of which comprises between 10 and 14 layers of electrode material, which material is between about 5 and 20 micrometers in thickness.

Each plate 10 is preferably provided with a means for connecting it into a cell, such as the electrical terminal 14 illustrated in FIG. 1. In that embodiment, each layer is generally rectangular, with a tab extending from one side forming the electrical terminal 14.

It can be seen that after formation and compression, electrolyte is able to flow between layers of each fold due to corrugations 13 or the like. It should also be noted that the drawing indicates only one electrode which may be either an anode or cathode depending on the particular material of which the plate 10 is made and the electrochemical cell in which it is used. Again, it should be emphasized that each layer or fold is electrically connected, that is, they make up one sheet and therefore react chemically as a single electrode when compressed and immersed in electrolyte.

In the folded embodiment of the electrode 10, it can be seen that electrode plate structures of this nature can be manufactured by roller or stamp press and cut in just one or two operations into a finished plate, without the need for application of other materials (as required in the prior art). It can also be seen that stiffening agents are not required to be mixed with the elements as the function of layered or laminated sheets produces rigid structures. Manufacture by casting or molding is also possible.

Figure 2:
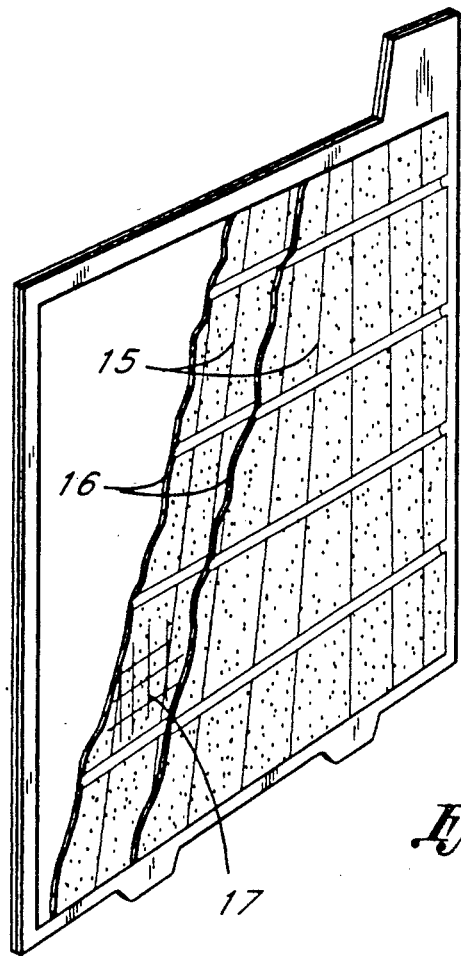
FIG. 2 is a partially cut away perspective view of a layered frame and paste electrode plate according to the present invention.

Another embodiment of the electrode plate 10 is illustrated in FIG. 2. In this embodiment, grids 15 are pasted on either side with active material 16. This active material 16 may be a conventional electrode paste, as is well known in the art. For example, in manufacture of a lead acid battery, the active material may be a porous paste comprising a binder and particulate lead or oxidized lead. The grids 15 are preferably made of lead or lead coated with oxide, and are thinner than conventional grids. Thus, for example, the individual grids 15 may be between about 45 and about 145 micrometers in thickness, preferably about 75 and about 100 micrometers, when they are used to make a lead acid battery. Each plate 10 of the battery can be formed of a plurality of pasted grids 15. The number of grids is essentially unlimited, with more grids per plate being used to provide deep cycle capacity in a battery, and fewer grids per plate but more plates per cell being used to make high amperage batteries. As an example, for an automobile battery, one may wish to provide plates having between 2 and 10 grids, depending on the type of battery. Of course, the layers of each individual plate are all electrically connected and not separated by layers of opposite polarity.

The electrical connection may advantageously be made around the periphery of the grids 15 comprising each individual plate. In the operation of the plate, diffusion occurs through the pores of the pasted active material 16, and is assisted by capillary action resulting from the close proximity of the pasted grids 15 in the plate. An optional reinforcing mesh 17 may be placed between the grids 15 in the plate. This mesh 15 may advantageously be made of glass fiber or other nonreactive material.

It can be appreciated from the accompanying Figures that liquid or gaseous flow is possible between layers of active materials when the electrode plates 10 are formed in accordance with the present invention. It is also possible, in accordance with the present invention, to provide solid electrolyte between layers, which electrolyte is held in place by compression.

In the plate of FIG. 1, electrolyte flow occurs through the perforations 12 and between the layers by capillary action, whereas in FIG. 2, electrolyte flow occurs through the pores of active material 16 and also between the layers of each plate by capillary action. The disclosed structures provide increased electrolyte exchange, and greater battery capacity. In comparisons with a lead acid battery having conventional pasted plate electrode design, a battery that used the electrode plate design of the present invention but was otherwise identical had a substantially increased power to weight ratio over the conventional battery. The rapid discharge capability of the battery is also facilitated.

While the present invention has been described in the context of certain preferred embodiments, it will be understood that other methods of manufacture and application which use a layered or laminated construction will fall within the spirit and scope of the present invention.

What is claimed is:

1. An electrode plate for use in an electrochemical cell, comprising:
   a single sheet of metal foil having a layer of metal oxide formed thereon which is folded concertina fashion and compressed into a plurality of conductive layers of oxide coated metal foil electrode material, each layer of electrode having surface structure formed thereon for separating it from adjacent layers by a sufficient distance to permit movement of electrolyte material between said layers, each layer being electrically connected to each adjoining layer of said electrode plate, without intervening layers of different polarity or non-electrode separating material.

2. The electrode plate of claim 1, wherein said surface structure comprises surface irregularities on the layers of said plate.

3. The electrode plate of claim 1, wherein said surface structure comprises corrugations, furrows, ridges, grooves, creases, or embossments on at one least surface of the facing layers of said electrode plate.

4. The electrode plate of claim 1, further comprising perforations or pores formed in said layers of electrode material to permit movement of electrolyte through said layers.

5. The electrode plate of claim 1, wherein the plate is formed of lead foil having a layer of lead oxide thereon.

6. A battery, comprising:
   a housing;
   a electrolyte in said housing; and
   at least one cell in said electrolyte, said cell comprising a cathode plate and an anode plate, wherein at least one of said plates is a layered plate in accordance with claim 1.

* * * * *